United States Patent [19]
Kimura et al.

[11] Patent Number: 5,756,056
[45] Date of Patent: May 26, 1998

[54] PROCESS FOR RECOVERING RARE EARTH METAL FROM OXIDE ORE BY CONCENTRATION AND SEPARATION

[75] Inventors: Akira Kimura; Kosuke Murai; Hiromasa Yakushiji, all of Hachinohe, Japan

[73] Assignee: Pacific Metals Co., Ltd., Tokyo, Japan

[21] Appl. No.: 748,630

[22] Filed: Nov. 13, 1996

[30] Foreign Application Priority Data

Nov. 22, 1995 [JP] Japan ................... 7-326281

[51] Int. Cl.$^6$ ........................................ C01F 17/00
[52] U.S. Cl. ................... 423/21.1; 423/140; 423/150.1
[58] Field of Search ..................... 423/140, 150.1, 423/21.1

[56] References Cited

U.S. PATENT DOCUMENTS

| | | | |
|---|---|---|---|
| 2,874,039 | 2/1959 | Pruvot | 423/21.1 |
| 3,049,403 | 8/1962 | Krumholz | 423/21.1 |
| 4,012,494 | 3/1977 | Lussiez | 423/53 |
| 4,503,017 | 3/1985 | Gadd et al. | 210/723 |
| 4,861,371 | 8/1989 | Lowenhaupt | 423/140 |
| 4,968,504 | 11/1990 | Rourke | 423/7 |
| 4,988,487 | 1/1991 | Lai et al. | 423/21.5 |

FOREIGN PATENT DOCUMENTS

| | | | |
|---|---|---|---|
| 0 547 744 | 6/1993 | European Pat. Off. | |
| 295611 | 11/1991 | Germany | 423/21.1 |
| 2 034 074 | 4/1995 | Russian Federation | |
| 1 715 874 | 2/1992 | U.S.S.R. | |

*Primary Examiner*—Wayne Langel
*Attorney, Agent, or Firm*—Wenderoth, Lind & Ponack

[57] ABSTRACT

A process for recovering scandium economically with high efficiency by concentration and separation from an oxide ore containing nickel and a small amount of scandium as well as a large amount of iron and/or aluminum comprises the steps of acid leaching the oxide ore under a high-temperature, high-pressure oxidative atmosphere while restraining leaching of the iron and/or aluminum, thereby selectively leaching substantially all nickel and scandium from the ore, recovering the nickel from the resulting leaching solution as a precipitated sulfide while not precipitating the scandium as a sulfide but leaving the total amount thereof in the solution, and then adjusting the pH of the solution with a precipitant to recover the scandium from the solution as a high-concentration scandium hydroxide or carbonate by concentration and separation.

15 Claims, No Drawings

PROCESS FOR RECOVERING RARE EARTH METAL FROM OXIDE ORE BY CONCENTRATION AND SEPARATION

BACKGROUND OF THE INVENTION

1. Field of the Invention

This invention relates to a process for recovering rare earth metal from oxide ore by concentration and separation, more particularly to a process for recovering a rare earth metal, especially scandium, contained in a small amount in a nickel-containing oxide ore containing Ni at about 0.05–4.0 wt % by concentration and separation. Still more particularly to a process for obtaining a concentrated scandium precipitate by first selectively recovering nickel as a sulfide precipitate from an acid leaching solution obtained by selectively acid leaching nickel and scandium from a nickel-containing laterite or nickel oxide ore under a high-temperature, high-pressure oxidative atmosphere and then obtaining the concentrated scandium precipitate from the solution by use of a precipitant.

This invention is particularly useful for recovering scandium (Sc) by concentration and separation from a nickel-containing oxide ore with a high iron and/or aluminum content. By the process of the invention, it is possible to obtain scandium hydroxide or carbonate containing scandium at a high concentration of 1–10 wt % from a nickel-containing oxide ore with a low scandium content of, for example, 0.0025–0.006 wt %.

2. Description of the Background Art

Scandium is used as a filler in metal-halide lamps installed at gymnasiums, hotels and the like for their high color rendering effect, as an additive in single crystal for solid-state laser oscillation sources, and as a long-afterglow orange phosphor for display CRTs.

Since scandium has recently been found to have very high potential for use in Lewis acid catalysts which utilize a rare earth compound as a type of acid called a Lewis acid, it is expected come into rapidly expanding use in the next generation of new catalysts.

While scandium is present in the earth's crust at about 5–10 ppm, ores that can be independently used for production of scandium are substantially nonexistent. In addition, it has very poor concentration property.

The conventional process for recovering scandium involves acid leaching from a substance containing a very small amount of scandium. After leaching under atmospheric pressure, scandium is separated and recovered by a process including solvent extraction, chelation and ion exchange.

When the scandium leaching rate is increased in this process, the iron and aluminum contained in large quantities in the ore are leached together with the scandium. The concentrations of iron and aluminum in the leaching solution therefore become several hundred times that of scandium. Since this results in very high acid consumption and also complicates the ensuing treatment of the solution, it is uneconomical and also problematic from the operational viewpoint.

SUMMARY OF THE INVENTION

For overcoming the drawbacks of the prior art, this invention provides a process for recovering rare earth metal from oxide ore by concentration and separation, specifically provides a process for recovering scandium economically with high efficiency by leaching a laterite or oxide ore containing nickel and a small amount of scandium as well as a large amount of iron and/or aluminum while restraining leaching of the iron and/or aluminum, thereby preferentially leaching nickel and scandium, recovering nickel from the resulting leaching solution as a precipitated sulfide, and then recovering scandium from the solution by concentration and separation.

The inventors discovered that the scandium content of nickel-containing oxide ores, while very small, is 5–10 times the Clarke number. Through various studies directed to recovering scandium from such ores with good efficiency by concentration and separation, the inventors found that acid leaching such an ore in a high-temperature, high-pressure oxidative atmosphere restrains the leaching of iron and aluminum while enabling nearly all nickel and scandium to be selectively leached from the ore with high efficiency.

The inventors further discovered that the nickel can be readily recovered from the leaching solution as a sulfide precipitate by use of a sulfidizing agent, while the scandium does not precipitate as a sulfide but remains in the leaching solution in its entirety.

In addition, the inventors discovered that since the leaching solution contains only a small amount of iron and/or aluminum, recovery of high-concentration scandium hydroxide and carbonate can be achieved in the ensuing treatment of the solution by concentration and separation through adjustment of the solution pH and the action of a precipitant. This invention was accomplished based on these findings.

DETAILED DESCRIPTION OF THE INVENTION

The nickel-containing oxide ore processed by the invention is typically one containing 0.0025–0.006% (percent by weight; hereinafter the same) scandium and 1–3% nickel, and further containing 15–50% iron and 2–5% aluminum. One such ore is laterite.

To recover nickel and scandium with high efficiency from such ores by concentration and separation, it is necessary to acid leach the ore while restraining the leaching of iron and aluminum as much as possible, thereby selectively leaching nickel and scandium.

Leaching of iron and aluminum can be restrained by conducting the acid leaching under a high-temperature, high-pressure oxidative atmosphere in an autoclave.

The acid leaching must be conducted at a temperature of at least 150° C. and pressure of at least 5 kg/cm$^2$, preferably at a temperature in the range of 220°–260° C. and a pressure of 24–48 kg/cm$^2$. Leaching of iron and aluminum is restrained under these conditions.

Although an oxidative atmosphere can be produced by the action of $Fe_2O_3$, $Al_2O_3$ and other oxides contained in the ore itself, it is more easily achieved by blowing oxygen or air into the autoclave.

The high-temperature, high-pressure condition is maintained by blowing steam into the autoclave. The leaching reaction can be promoted by augmenting the steam stirring with stirring by an impeller, in which case the reaction can be completed within one hour.

Although the acid used can be sulfuric acid, hydrochloric acid or nitric acid, use of sulfuric acid is preferable in light of the corrosion characteristics of the autoclave material. The amount of acid used is adjusted so that the pH of the leaching solution after the high-temperature, high-pressure acid leaching is around 1, preferably in the range of 0.5–2.0, at normal room temperature.

When acid leaching is conducted under the foregoing conditions, 95% or more of the nickel and scandium are leached from the ore. while leaching of iron and aluminum is held to not more than 5% and not more than 10%, respectively.

The leaching solution obtained in this invention contains nickel and a small amount of scandium as well as iron and aluminum.

The leaching solution is first adjusted to a pH of 2–4, preferably 3–4, by the alkali action of sodium carbonate, calcium carbonate, ammonium carbonate, magnesium carbonate, sodium hydroxide, calcium hydroxide, ammonia solution, magnesium hydroxide, calcium oxide, magnesium oxide, or the like. When the pH is adjusted within this range, nearly all of the iron and 80% of the aluminum are removed by precipitation as hydroxides or carbonates.

The iron is almost completely removed because the almost all of the iron leached by the acid leaching under the high-temperature, high-pressure oxidative atmosphere is present as trivalent iron. Adjustment of the pH to the range of 2–4 also enhances the efficiency with which nickel is recovered as a sulfide in the next step.

Next, a sulfidizing agent such as sodium hydrosulfide, sodium sulfide, ammonium sulfide, hydrogen sulfide or the like is added to the solution so as to selectively precipitate and recover nickel as a sulfide.

At this point, upward of about 98% of the nickel precipitates as sulfide, but the scandium remains in the leaching solution. The pH of the leaching solution is next adjusted to between greater than 4 and not greater than 6, preferably to between 5 and 6 by the alkali action of sodium carbonate, calcium carbonate, ammonium carbonate, magnesium carbonate, sodium hydroxide, calcium hydroxide, ammonia solution, magnesium hydroxide, calcium oxide, magnesium oxide, or the like. As a result, the total amount of scandium precipitates as hydroxide or carbonate, whereby the scandium can be recovered by concentration and separation.

EXAMPLES

The invention will now be explained with reference to examples.

Example 1

A 30% aqueous slurry of nickel-containing laterite ore (1.0% Ni, 0.10% Co, 47.4% Fe, 3.0% Al and 0.005% Sc) was added with 98% sulfuric acid at the rate of 145 g per 1 kg of the ore and leached in an autoclave at a temperature of 240° C. and a pressure of 35 kg/cm$^2$ for 1 hr, whereafter the autoclave pressure was lowered to atmospheric pressure.

The leaching solution obtained had a pH of 0.95 at normal room temperature and contained Ni at 4.9 g/l, Co at 0.5 g/l, Fe at 2.4 g/l, Al at 0.5 g/l and Sc at 0.025 g/l. The leaching rates of Ni, Co and Sc were 95%, 96% and 95%, while those of Fe and Al were held to only 1% and 3%.

The leaching solution was adjusted to a pH of 3.5 by addition of calcium carbonate to precipitate and remove Fe and Al as carbonates. The solution was then added with sodium hydrosulfide at 1.1 times the stoichiometrical equivalent required for converting Ni and Co to NiS and CoS, thereby precipitating and recovering Ni and Co as sulfides. The precipitation removal rates of Fe and Al were 98% and 75% and those of Ni id Co were both 98%. All Sc remained in the solution.

The sulfidized solution was adjusted to a pH of 5.5 by addition of sodium carbonate to precipitate and recover Sc as a carbonate. The precipitation recovery rate of Sc was 100%. The Sc concentrate obtained contained 4.9% Sc, 3.9% Fe, 22.3% Al, 0.3% Ni and 0.01% Co. The Sc concentration of the concentrate obtained was 980 times that of the nickel-containing laterite ore.

Example 2

A 25% aqueous slurry of nickel-containing oxide ore (1.8% Ni, 0.13% Co, 32.5% Fe, 2.1% Al and 0.003% Sc) was added with 98% sulfuric acid at the rate of 265 g per 1 kg of the ore and leached in an autoclave at a temperature of 240° C. and a pressure of 35 kg/cm$^2$ for 1 hr, whereafter the autoclave pressure was lowered to atmospheric pressure.

The leaching solution obtained had a pH of 0.85 at normal room temperature and contained Ni at 6.6 g/l, Co at 0.5 g/l, Fe at 2.5 g/l, Al at 0.4 g/l and Sc at 0.011 g/l. The leaching rates of Ni, Co and Sc were all 96%, while those of Fe and Al were only 2% and 5%.

The leaching solution was adjusted to a pH of 3.8 by addition of calcium hydroxide to precipitate and remove Fe and Al as hydroxides. The solution was then added with sodium hydrosulfide at 1.1 times the stoichiometrical equivalent required for converting Ni and Co to NiS and CoS, thereby precipitating and recovering Ni and Co as sulfides. The precipitation removal rates of Fe and Al were 98% and 85% and the sulfidization rates of Ni and Co were both 98%. 90% of the Sc remained in the solution.

The sulfidized solution was adjusted to a pH of 5.5 by addition of sodium hydroxide to precipitate and recover Sc as a hydroxide. The precipitation recovery rate of Sc was 100%. The Sc concentrate obtained contained 4.0% Sc, 3.6% Fe, 24.5% Al, 0.4% Ni and 0.02% Co. The Sc concentration of the concentrate obtained was 1,333 times that of the nickel-containing oxide ore.

Since the invention enables preferential leaching of substantially all nickel and scandium from a material containing nickel and scandium together with large amounts of iron and/or aluminum with almost no leaching of the iron or aluminum, it greatly reduces the amount of acid consumed by the leaching and is therefore highly advantageous in terms of cost.

Since the nickel can be separated and recovered as a sulfide and the scandium be separated and recovered as a hydroxide or carbonate, scandium can be recovered as a high-concentration scandium precipitate.

Since the high-concentration scandium precipitate obtained by the invention process is a hydroxide or a carbonate, it can be readily dissolved in acid to obtain a high-concentration scandium solution. As a result, scandium with a high purity of 99% or more can thereafter be easily and efficiently produced by chelation extraction or solvent extraction.

What is claimed is:

1. A process: for recovering scandium by concentration and separation comprising the steps of selectively leaching nickel and scandium from a nickel-containing oxide ore into an acid solution at a temperature of at least 150° C. and a pressure of at least 5 kg/cm$^2$ in an oxidative atmosphere, thereby obtaining a solution containing nickel and scandium, adjusting the pH of the solution to a value between 2 and 4, selectively precipitating and recovering nickel from the solution as a sulfide, and adjusting the pH of the solution to a value greater than 4 to form a concentrated precipitate of scandium from the solution.

2. A process according to claim 1, wherein the acid solution is a sulfuric acid solution, a nitric acid solution or a hydrochloric acid solution.

3. A process according to claim 1, wherein the concentrated precipitate of scandium is a hydroxide or a carbonate.

4. A process according to claim 1, wherein after the pH is adjusted to a value between 2 and 4, nickel is precipitated by the addition of a sulfidizing agent selected from the group consisting of sodium hydrosulfide, sodium sulfide, ammonium sulfide and hydrogen sulfide to the solution.

5. A process according to claim 1, wherein the pH is adjusted by adding a compound selected from the group consisting of sodium carbonate, calcium carbonate, ammonium carbonate, magnesium carbonate, sodium hydroxide, calcium hydroxide, ammonia solution, magnesium hydroxide, calcium oxide and magnesium oxide.

6. A process for recovering scandium by concentration and separation comprising the steps of selectively leaching nickel and scandium from a nickel-containing oxide ore into an acid solution at a temperature of 220°–260° C. and a pressure of 24–48 kg/cm$^2$ in an oxidative atmosphere, thereby obtaining a solution containing nickel and scandium, adjusting the pH of the solution to a value between 2 and 4, selectively precipitating and recovering nickel from the solution as a sulfide, and adjusting the pH of the solution to between 4 and 6, to form a concentrated precipitate of scandium from the solution.

7. A process according to claim 6, wherein the acid solution is a sulfuric acid solution, a nitric acid solution or a hydrochloric acid solution.

8. A process according to claim 6, wherein the concentrated precipitate of scandium is a hydroxide or a carbonate.

9. A process according to claim 6, wherein after the pH is adjusted to a value between 2 and 4, nickel is precipitated by the addition of a sulfidizing agent selected from sodium hydrosulfide, sodium sulfide, ammonium sulfide and hydrogen sulfide to the solution.

10. A process according to claim 6, wherein the pH is adjusted by adding a compound selected from the consisting of sodium carbonate, calcium carbonate, ammonium carbonate, magnesium carbonate, sodium hydroxide, calcium hydroxide, ammonia solution, magnesium hydroxide, calcium oxide and magnesium oxide.

11. A process according to claim 1, wherein the pH of the solution is adjusted to a value between 4 and 6 to form the concentrated precipitate of scandium.

12. A process according to claim 11, wherein the pH of the solution is adjusted to a value between 5 and 6 to form the concentrated precipitate of scandium.

13. A process according to claim 6, wherein the pH of the solution is adjusted to a value between 5 and 6 to form the concentrated precipitate of scandium.

14. A process according to claim 1, wherein the pH of the solution is adjusted to a value between 3 and 4 prior to selectively precipitating nickel as a sulfide.

15. A process according to claim 6, wherein the pH of the solution is adjusted to a value between 3 and 4 prior to selectively precipitating nickel as a sulfide.

* * * * *